(12) United States Patent
Shidate et al.

(10) Patent No.: US 6,473,569 B1
(45) Date of Patent: Oct. 29, 2002

(54) CAMERA AND INFORMATION PROCESSING APPARATUS

(75) Inventors: Ichiro Shidate, Kawasaki (JP); Toshihisa Kuroiwa, Miura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/505,282

(22) Filed: Feb. 16, 2000

(30) Foreign Application Priority Data

Sep. 22, 1999 (JP) .......................................... 11-268888

(51) Int. Cl.[7] ................................................. G03B 7/26
(52) U.S. Cl. ...................................... 396/280; 348/232
(58) Field of Search ................................. 348/231, 232, 348/233; 396/280

(56) References Cited

U.S. PATENT DOCUMENTS 4,733,265 A * 3/1988 Haaguchi et al. ........... 396/280
5,610,723 A * 3/1997 Yamagishi ................... 386/121
6,330,028 B1 * 12/2001 Oie et al. ..................... 348/220

* cited by examiner

*Primary Examiner*—David M. Gray
(74) *Attorney, Agent, or Firm*—Oliff & Berridge, PLC

(57) ABSTRACT

A camera that records image data generated by electronically capturing an image of a subject in a removable memory, includes: a non-volatile memory that differs from the removable memory in which the image data are recorded, and a main MPU that saves management information related to recording or reproduction in the removable memory into the non-volatile before power to the camera is cut off, reads out the management information from the non-volatile memory after the power to the camera is turned on, and recovers the management information stored before the power is cut off based on the management information read out by the main MPU, the management information being generated based on information read out from the removable memory.

24 Claims, 5 Drawing Sheets

<<MONITORING OPERATION BY SUB-MPU>>

<<POWER ON PROCESSING ROUTINE>>

CAMERA AND INFORMATION PROCESSING APPARATUS

INCORPORATION BY REFERENCE

The disclosure of the following priority application is herein incorporated by reference: Japanese Patent Application No. 11-268888 filed Sep. 22, 1999.

BACKGROUND OF THE INVENTION

1. Field of the Invention

The present invention relates to a camera and an information processing apparatus that save/recover (or retrieve) information regarding a removable memory and the like at power off/on.

2. Description of the Related Art

There are cameras that record image data obtained through electronic image-capturing in a removable memory in the prior art. In this type of camera, the operator selects and uses a specific appropriate type of removable memory among exchangeable removable memories with varying recording structures (the number of cylinders, the number of heads, the number of sectors and so forth) and varying data input/output speeds. In addition, the utilization status (such as the remaining capacity) of a removable memory always changes as image data are recorded.

This means that it is necessary to reset management information for the removable memory by verifying the recording capacity, the recording structure, the speed and the updated utilization status of the removable memory on the camera side every time the power is turned on.

In addition, when the camera is operated in a reproduction mode, it is necessary to detect names of all the image files and directories present within the removable memory and determine the order of reproduction by rearranging them in conformance to a specific rule. This task, too, must be executed every time the power is turned on.

As a result, it takes a considerable length of time to enter a ready state for a read/write to be performed on the removable memory in the prior art. This leads to a problem in that a photographing operation or a reproduction operation cannot be started promptly after the power is turned on.

SUMMARY OF THE INVENTION

An object of the present invention is to provide a camera and an information processing apparatus that are capable of starting a photographing operation or a reproduction operation promptly after the power is turned on.

In order to attain the above object, a camera according to the present invention that records image data generated by electronically capturing an image of a subject in a removable memory, comprises: a non-volatile memory; a means for data saving that saves management information related to recording or reproduction in the removable memory in the non-volatile memory before power to the camera is cut off; a means for data acquisition that reads out the management information from the non-volatile memory after the power to the camera is turned on; and a means for recovery that recovers the management information stored before the power is cut off based upon the management information read out by the means for data acquisition.

In this camera, it is preferred that the means for data saving saves the management information in the non-volatile memory during an operation performed to turn off the power to the camera.

Also, it is preferred that the management information saved by the means for data saving is status information that indicates whether or not the currently loaded removable memory can be utilized for image data recording.

Also, it is preferred that the management information saved by the means for data saving is removable memory hardware information that is required for removable memory device driver setting.

Also, it is preferred that the management information saved by the means for data saving is file system information required for management of files in the removable memory.

Also, it is preferred that the management information saved by the means for data saving is updated each time image data are recorded in the removable memory and includes at least one of a number of frames, an image file name and a directory name.

Also, it is preferred that the management information saved by the means for data saving is information required to reproduce image data from the removable memory and includes at least one of information indicating an image file to be reproduced first and reproduction order information.

It is preferred that the above cameras further comprise: a means for decision-making that makes a decision as to whether or not the removable memory has been replaced; and a means for restructuring that halts recovery of management information saved in the non-volatile memory and restructures new management information, when the means for decision-making decides that "the removable memory has been replaced during power off".

In these cameras, it is preferred that the means for decision-making, under auxiliary power, monitors for an operation to replace the removable memory during power off and starts up the means for restructuring upon detecting a replacement; and the means for restructuring starts restructuring management information even during a power off effected by an operator.

Also, it is preferred that the means for decision-making, under auxiliary power, monitors for an operation to replace the removable memory during power off; and the means for restructuring restructures new management information by halting recovery of the management information saved in the non-volatile memory when the auxiliary power to the means for decision-making is cut off.

A camera according to the present invention that captures an image of a subject, comprises: a non-volatile memory; a means for data saving that saves management information managed by the camera in the non-volatile memory before power to the camera is cut off; a means for data acquisition that reads out the management information from the non-volatile memory after the power to the camera is turned on; and a means for recovery that recovers the management information stored before the power is cut off based upon the management information read out by the means for data acquisition. And the means for data saving additionally records new management information in an unrecorded area on the non-volatile memory and erases old management information in a batch when a specific volume of old management information has accumulated, and the means for data acquisition reads out most recent management information from the non-volatile memory.

A camera according to the present invention comprises: a plurality of microprocessors that share in a control operation. And, the plurality of microprocessors share and manage management information for the camera in correspondence to individual shares of the control operation, and save and recover individual shares of the management information when power to the camera is turned off and on.

An information processing apparatus according to the present invention at which a removable memory is detachably mounted, comprises: a non-volatile memory; a means for data saving that saves management information related to recording or reproduction in the removable memory in the non-volatile memory before power to the information processing apparatus is cut off; a means for data acquisition that reads out the management information from the non-volatile memory after the power to the information processing apparatus is turned on; and a means for recovery that recovers the management information stored before the power is cut off based upon the management information read out by the means for data acquisition.

A recording medium according to the present invention contains a program utilized in an information processing apparatus at which a removable memory is detachably mounted. The program comprises: a data save instruction to save management information related to recording or reproduction in the removable memory to the non-volatile memory before power to the information processing apparatus is cut off; a data acquisition instruction to read out the management information from the non-volatile memory after the power to the information processing apparatus is turned on; and a recovery instruction to recover the management information stored before the power is cut off based upon the management information read out by the data acquisition instruction.

A data signal according to the present invention embodied in a carrier wave comprises a program utilized in an information processing apparatus at which a removable memory is detachably mounted. The program comprises: a data save instruction to save management information related to recording or reproduction in the removable memory to the non-volatile memory before power to the information processing apparatus is cut off; a data acquisition instruction to read out the management information from the non-volatile memory after the power to the information processing apparatus is turned on; and a recovery instruction to recover the management information stored before the power is cut off based upon the management information read out by the data acquisition instruction.

BRIEF DESCRIPTION OF THE DRAWINGS

FIG. 5 presents the processing routine implemented when the power is turned on.

DESCRIPTION OF THE PREFERRED EMBODIMENTS

The following is an explanation of an embodiment of the present invention given in reference to the drawings.
(Structure Adopted in the Embodiment)

Figure 1:
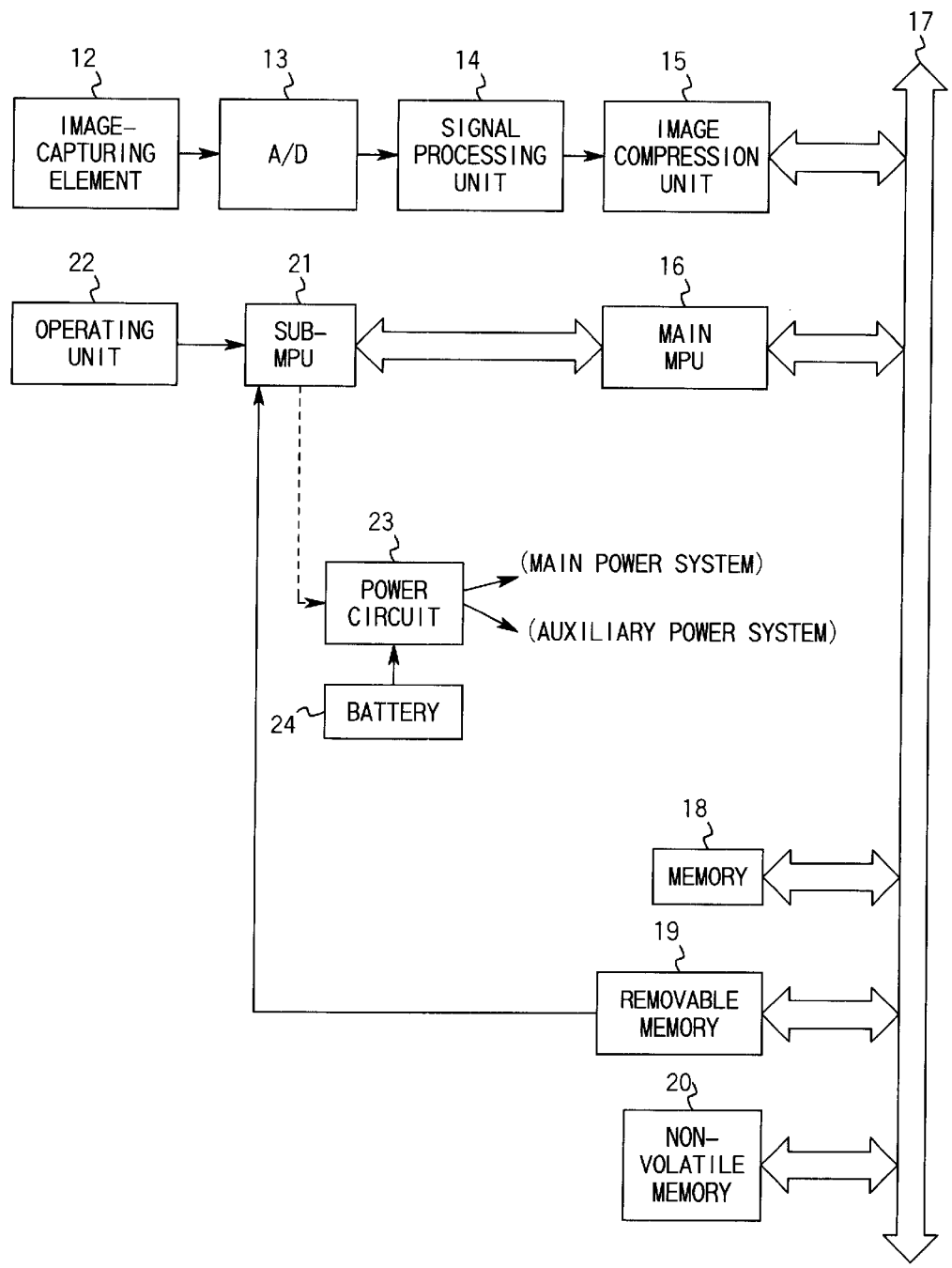
FIG. 1 is a block diagram illustrating the structure of the electronic camera 11 in an embodiment.

FIG. 1 is a block diagram illustrating the structure of an electronic camera 11 in the embodiment.

In FIG. 1, the electronic camera 11 is provided with an image-capturing element 12 that captures an image of a subject. The image output from the image-capturing element 12 first travels sequentially through an A/D conversion circuit 13 that performs quantization, a signal processing unit 14 that engages in gamma correction, color signal processing and the like and a compression processing unit 15 that engages in image compression and then is output to a system bus 17 of a main MPU 16.

A memory 18, a removable memory 19 and a non-volatile memory 20 where management information is saved are connected to the system bus 17. The non-volatile memory 20 may be constituted of, for instance, a flash memory.

The electronic camera 11 is further provided with a sub-MPU 21. The sub-MPU 21 shares the function of monitoring for an operation to detach the removable memory 19, a setting operation on an operating unit 22 and the like performed by the operator and notifying the main MPU 16 of the operating statuses.

In addition, the electronic camera 11 is provided with a power circuit 23. This power circuit 23 stabilizes the output voltage from a battery 24 and outputs a voltage to two separate power systems (a main system and an auxiliary system). The main power system supplies power to main circuits such as the image-capturing element 12 and the main MPU 16. Under normal circumstances, the main power system stops the power supply when the power of the electronic camera 11 is turned off. The auxiliary power system, on the other hand, supplies power at all times to circuits such as the sub-MPU 21 that sustain operation even while the power is off.

Next, the operations of the electronic camera 11 performed when the power is turned off and when the power is turned on again, which characterize the present invention, are explained in order.
(Operation Performed when the Power is Off)

Upon receiving a notice that "the operator has turned off the power" from the sub-MPU 21, the main MPU 16 executes the power-off processing routine. Alternatively, the power may be turned off by a power-off timer instead of through an operation performed by the operator.

Figure 2:
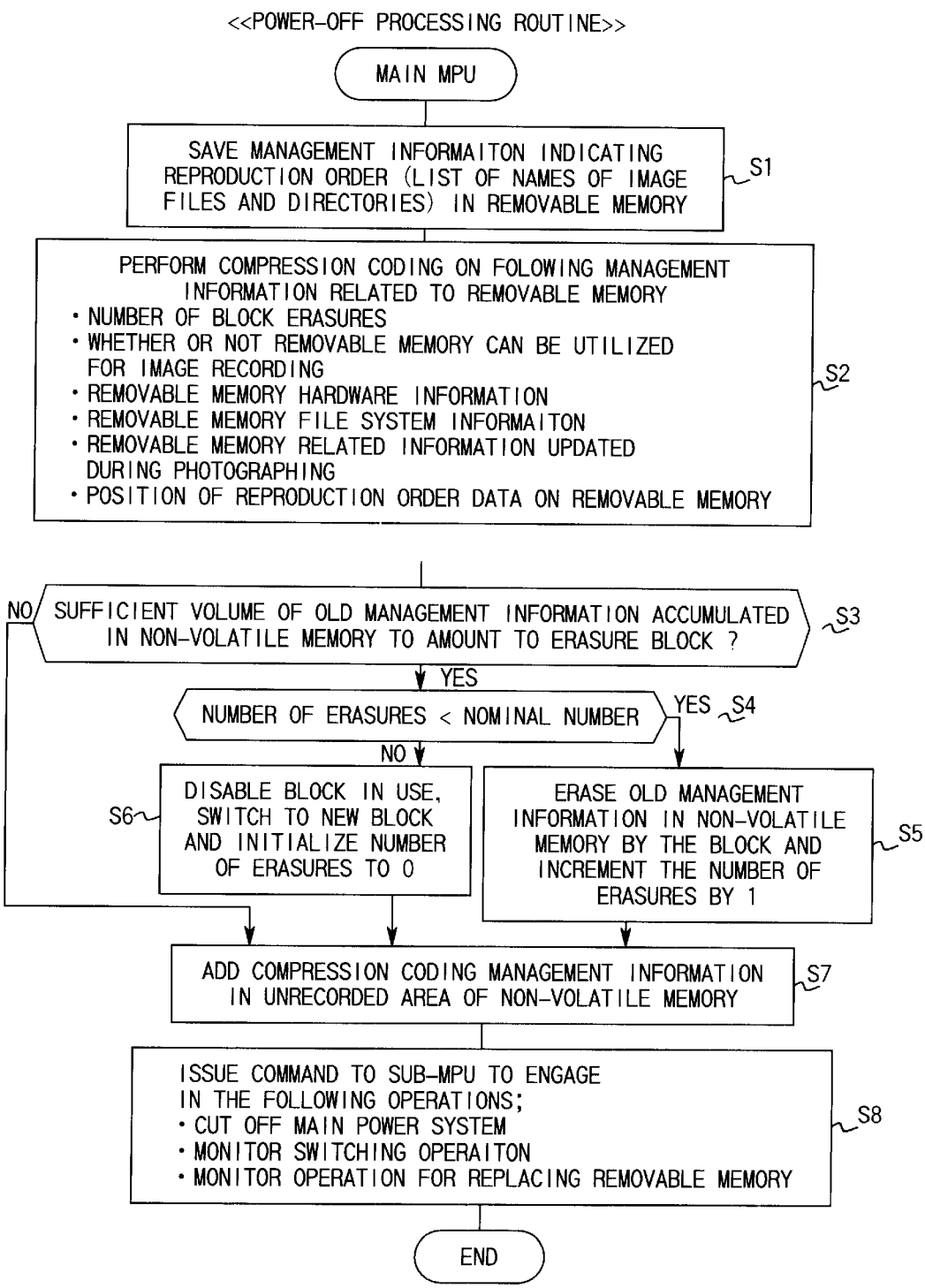
FIG. 2 presents the processing routine implemented when the power is turned off.

FIG. 2 presents the processing routine executed when the power is turned off. The following is a step-by-step explanation of the operation performed when the power is turned off given in reference to the step numbers in FIG. 2.

"Step S1" The main MPU 16 saves the management information (the list of the names of the image files and directories arranged in the order in which they are to be reproduced) that has been prepared in advance in the memory 18 and indicates the reproduction order, in the removable memory 19.

"Step S2" The main MPU 16 performs compression coding on the information items in the management information listed below. Next, specific contents of the management information items handled in this process are individually explained.

The Number of Block Erasures in the Non-volatile Memory 20

The number of times an erasure has been performed for a block in use in the non-volatile memory 20.
Status Information Indicating Whether or Not the Removable Memory 19 can be Utilized for Image Recording.

There are cards that are not intended for data storage among CF cards and PC cards, any of which may be utilized as the removable memory 19. Thus, immediately after the removable memory 19 is loaded, the main MPU 16 reads out card attribute information (CIS) of the removable memory 19 to obtain status information that indicates whether or not the removable memory 19 can be utilized in the camera. The main MPU 16 sets the status information in the memory 18 for management, and prior to a read/write operation at the removable memory, the main MPU 16 references the status information.

It is to be noted that if the removable memory is loaded in an abnormal manner or if no removal memory has been loaded, flag information indicating that use is disabled is stored in the status information.

Removable Memory Hardware Information

If the removable memory 19 conforms to the PC card ATA standard, the data recording area is managed by a cylinder (C), a head (H) and a sector (S). This hardware information is required to accurately access a target sector. The main MPU 16 obtains the hardware information from a specific position within the removable memory 19 immediately after the removable memory 19 is loaded. Based upon the hardware information, the main MPU 16 performs software setting of the device driver for the removable memory 19.

In addition, the hardware information may include removable memory I/F timing setting data, removable memory operating mode setting data (memory mode setting, I/O mode setting and the like in the PC card ATA), removable memory register map information (address offset) and the like.

It is to be noted that the removable memory 19 may allow use of logic block addresses (LBA). In such a case, flag information "LBA valid" is also stored in hardware information.

Removable Memory File System Information

In most cases, the electronic camera 11 manages files on the removable memory 19 by using a file system such as DOS. Basic data required in the file system are created and managed on the memory 18 by the main MPU 16. For instance, the basic data include the offset to the PBR (Partition Boot Record), the total number of partition sectors and the BPB (BIOS Parameter Block).

Removable Memory Related Information that is Updated During Photographing

As image data are recorded in the removable memory 19, the number of photographic frames, the number of remaining frames, the remaining capacity, the name of the next image file, the name of the next directory for storage and the like are constantly updated. The main MPU 16 places such updated information on the memory 18 for management.

In addition, if image files are not stored in a single directory, the information may include information such as the number of frames over which photographing has been completed in each directory or the total number of frames over which photographing has been completed in all the directories.

It is to be noted that if a directory name or a file name includes a fixed name and a variable name (an ID number or the like), only the variable name needs to be included in the updated information. Known examples of naming rules that may be adopted under these circumstances include "the Design Rule for Camera File Systems (DCF)," (JEIDA Standards).

Position of Reproduction Order Data in the Removable Memory

This is information required in step S1 explained earlier to read out the saved data stored in the removable memory 19 indicating the reproduction order. It is to be noted that if the reproduction order data are recorded in a specific directory in the removable memory as a fixed name file (DOS), no positional information is required, and in such a case, reference data such as the file creation date may be recorded in the non-volatile memory. By referencing this reference data when performing a reproduction operation, a decision can be made as to whether or not the reproduction order data are valid.

"Step S3" The main MPU 16 makes a decision as to whether or not old management information has accumulated in the non-volatile memory 20 to amount to a block unit (e.g., 64 Kbites) that allows an erasure. If a sufficient volume of old management information has accumulated, the main MPU 16 shifts the operation to step S4. If, on the other hand, a sufficient volume of old management information has not accumulated, the main MPU 16 shifts the operation to step S7.

"Step S4" The main MPU 16 makes a decision as to whether or not the number of times an erasure has been performed in the block in use in the non-volatile memory 20 is smaller than the number of erasures stipulated as the nominal service life. If it is smaller than the number of erasures stipulated as the nominal service life (100,000 erasures, for example), the main MPU 16 shifts the operation to step S5. If, on the other hand, the block has reached the end of its nominal service life, the main MPU 16 decides that the reliability of the block in use is low and shifts the operation to step S6.

"Step S5" The main MPU 16 decides that the block in use in the non-volatile memory 20 allows a further erasure, and performs a batch erase for the block in use. At this time, the main MPU 16 increases the value indicating the number of erasures managed on the memory 18 by 1.

"Step S6" The main MPU 16 decides that the nominal service life of the block in use in the non-volatile memory 20 has expired, sets the block currently in use in a disabled state and sets a new block as the block in use. At this time, the main MPU 16 initializes the value indicating the number of erasures managed on the memory 18 to 0.

Figure 3:
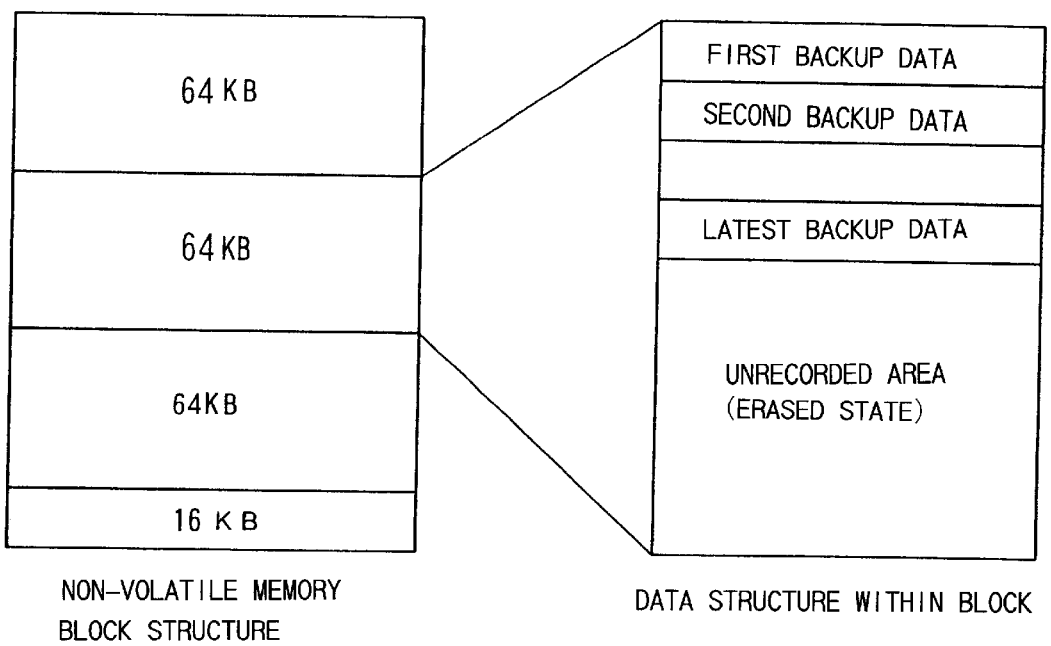
FIG. 3 illustrates a state of the management information additionally recorded in the non-volatile memory 20.

"Step S7" The main MPU 16 additionally records the management information having undergone compression coding in step S2 in an unrecorded area of the non-volatile memory as the latest backup data. FIG. 3 illustrates the state in which the latest backup data that are additionally stored are recorded.

It is to be noted that while the number of block erasures is included in each set of saved data (see FIG. 3) since the size of the data indicating the number of block erasures is small in this example, the present invention is not limited to the example. For instance, it suffices to record the number of block erasures at a specific address (e.g., at the head of the block in use) in the block in use. By not including the number of block erasures in each set of saved data, the data volume of saved data can be reduced.

"Step S8" After issuing a command for the following operations to the sub-MPU 21, the main MPU 16 shifts into an inactive state.

Cut off the Main Power System

Monitor the Operating Unit 22

Monitor the Operation to Replace the Removable Memory 19

Having performed the operations explained above, the power-off processing routine is completed.

Next, the monitoring operation by the sub-MPU 21, which is executed continuously from the operation in step S8 is explained.

(Monitoring Operation by the Sub-MPU 21)

Figure 4:
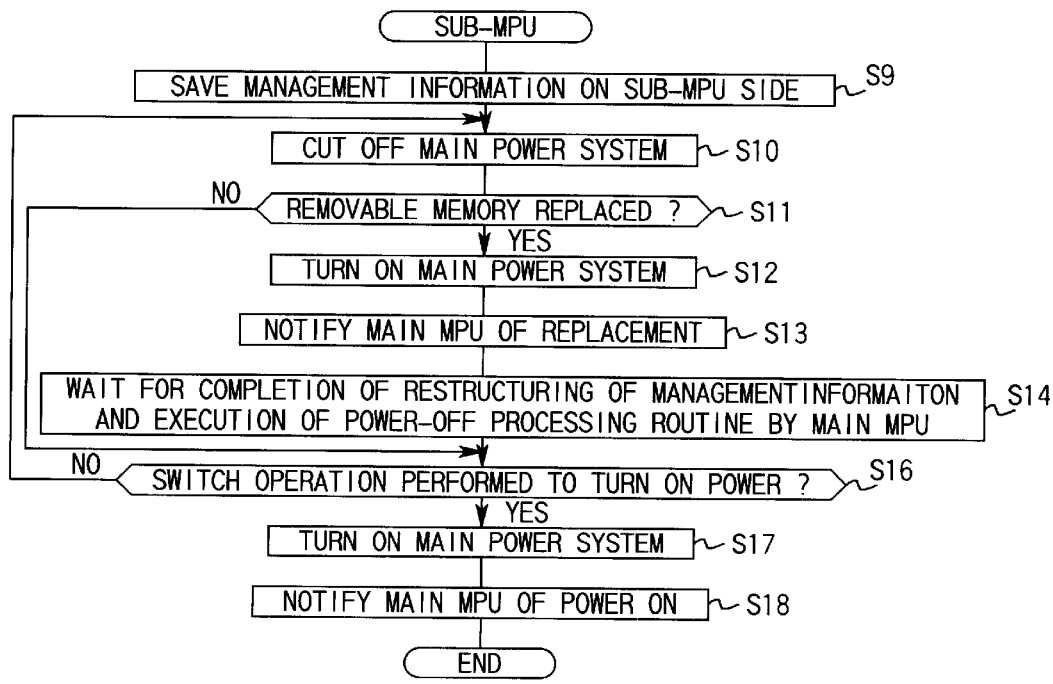
FIG. 4 is a flowchart of the monitoring operation performed by the sub-MPU 21.

FIG. 4 is a flowchart of the monitoring operation performed by the sub-MPU 21. The following is a step-by-step explanation of the monitoring operation performed during a power off state given in reference to the step numbers in FIG. 4.

"Step S9" First, the sub-MPU 21 saves the management information that it manages on its own in the non-volatile memory 20 (or in a dedicated non-volatile memory exclusively provided for the sub-MPU). This is a pre-emptive operation performed to prevent problems caused by loss of the management information due to a momentary disconnection (e.g., battery replacement) of the auxiliary power system. At the time of a reset startup after such a momentary disconnection, the sub-MPU 21 reads out the saved management information to achieve prompt recovery of the management information, the management of which it shares.

"Step S10" The sub-MPU 21 issues a command to the power circuit 23 to cut off the main power system. The power circuit 23 halts the power supply implemented via the main power system and shifts into a power-saving mode supported by the auxiliary power system alone.

"Step S11" The sub-MPU 21 makes a decision as to whether or not the removable memory has been replaced. At this point, if the removable memory has been replaced, the sub-MPU 21 shifts the operation to step S12. If, on the other hand, the removable memory has not been replaced, the sub-MPU 21 shifts the operation to step S16.

It is to be noted that the sub-MPU 21 may set only a removable memory replacement flag related to a removable memory replacement operation if the main power system has been turned off through an operation performed by the operator, and may execute the processing in steps S12~S15 by performing decision-making with respect to the replacement flag when the operator turns on the main power system again (after step S16). If, on the other hand, the main power system has been turned off by the power-off timer, the operation may proceed directly to step S12 in response to a replacement of removable memory.

"Step S12" In order to respond to the removable memory replacement, the sub-MPU 21 issues a command to the power circuit 23 to turn on the main power system.

"Step S13" Next, the sub-MPU 21 notifies the main MPU 16, which has entered an active state, that the removable memory has been replaced.

"Step S14" The sub-MPU 21 waits for the main MPU 16 to complete the processing described below. The main MPU 16 collects information on the newly loaded removable memory 19 and restructures new management information. Upon completing the restructuring of the management information, the main MPU 16 executes the power-off processing routine in FIG. 2 again and then re-enters an inactive state.

"Step S16" The sub-MPU 21 makes a decision as to whether or not a power-on operation has been performed via the operating unit 22. At this point, if a power-on operation has not been performed, the sub-MPU 21 returns to the operation in step S10. If, on the other hand, a power-on operation has been performed, the sub-MPU 21 shifts the operation to step S17.

"Step S17" The sub-MPU 21 issues a command to the power circuit 23 to turn on the main power system.

"Step S18" The sub-MPU 21 notifies the main MPU 16, which has entered an active state, that a power-on operation has been performed. Then, the sub-MPU 21 shifts to a normal monitoring operation.

The monitoring operation is executed by the sub-MPU 21 through the flow of the series of operations explained above.

Next, the power on processing routine, which is executed following step S18 described above, is explained.

(Processing Routine Performed when the Main Power System is Turned on)

Figure 5:
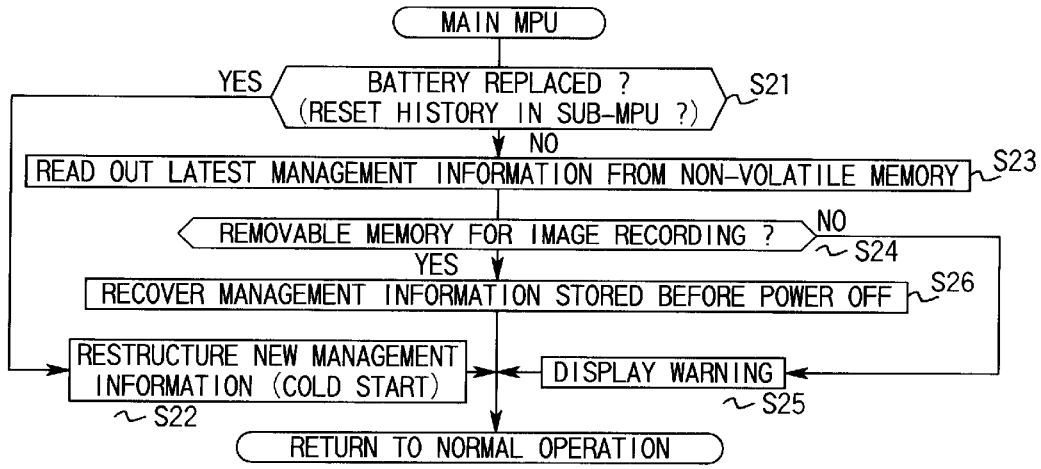

FIG. 5 presents the power on processing routine executed by the main MPU 16. The following is a step-by-step explanation of the operation performed when the power is turned on given in reference to the step numbers in FIG. 5.

"Step S21" First, the main MPU 16 makes a decision as to whether or not the sub-MPU 21 has a history of reset startup. If it is decided that the sub-MPU 21 has a history of reset startup, the main MPU 16 decides that the sub-MPU 21 has had an inactive period and shifts the operation to step S22. If, on the other hand, there is no history of reset startup, the main MPU 16 shifts the operation to step S23.

It is to be noted that a reset history notice may be transmitted through data communication between the MPUs, the reset history may be determined in conformance to the level indicated by the output port signal from the sub-MPU 21 or a reset history notice may be issued by setting data on the memory shared by the MPUs. This notice may be issued in step S18 explained earlier.

"Step S22" Assuming that the removable memory has been replaced while the sub-MPU 21 has been in an inactive state (that is a cold start), the main MPU 16 restructures new management information. This operation is performed by the main MPU 16 when the removable memory has been replaced while the auxiliary power system is in an off state and the sub-MPU 21 is in a non-operating state due to, for instance, depletion of the battery 24. When the restructuring is completed, the main MPU 16 returns to the normal operation.

"Step S23" The main MPU 16 reads out the latest management information in the management information saved in the non-volatile memory 20.

"Step S24" The main MPU 16 first makes a decision as to whether or not the removable memory can be utilized for image recording based upon the status information in the management information that has been read out. If the removable memory is determined to be unusable, the main MPU 16 shifts the operation to step S25. If, on the other hand, it is decided that the removal memory can be utilized for image recording, the main MPU 16 shifts the operation to step S26.

"Step S25" The main MPU 16 displays a warning that the removable memory 19 cannot be utilized for image recording at a display unit (not shown). Then, the main MPU 16 and the like enter an inactive state and wait for the sub-MPU 21 to send a notice that a removable memory 19 has been loaded.

"Step S26" The main MPU 16 recovers (or retrieves) the management information stored before the power was turned off based upon the management memory read out from the non-volatile memory 20. It is to be noted that the management memory indicating the reproduction order is recovered by reading out the reproduction order from the removable memory 19 based upon the "reproduction order data position" or the reference data. After completing the recovery of the management information in this manner, the main MPU 16 returns to normal operation.

The management information stored before the power-off is accurately recovered through the series of operations explained above.

(Advantages of the Embodiment)

Through the operations described above, the management information related to read/write performed on the removable memory 19 is saved/recovered in response to power off/on in the embodiment. As a result, the task of setting the management information performed when the power is turned on is simplified to allow a read/write operation on the removable memory 19 to be started promptly.

In particular, the management information indicating the reproduction order that accounts for a large data volume is saved in the removable memory 19. Consequently, the volume of data saved in the non-volatile memory 20 is reduced so that the overwrite service life of the non-volatile memory 20 is extended.

In addition, the management information is stored in the non-volatile memory 20 in a compression coding state in the embodiment. As a result, the volume of data saved in the non-volatile memory 20 is reduced so that the overwrite service life of the non-volatile memory 20 is extended.

Furthermore, the management information that is saved includes status information that indicates whether or not the removable memory 19 can be utilized in the embodiment. Thus, the status information can be verified first when the power is turned on to eliminate an unnecessary recovery operation.

Moreover, the management of the management information such as an overwrite is implemented on the memory 18 and the management information is saved in the non-volatile memory 20 at the time of power off in the embodiment. As a result, the number of times data are recorded in the non-volatile memory 20 is minimized, to extend the overwrite service life of the non-volatile memory 20.

Under normal circumstances, if all the management information is saved in the non-volatile memory, the overwrite service life of the non-volatile memory is reduced. In addition, it is not necessary to save management information that can be prepared easily. In consideration of these points, management information that is particularly effective in achieving a reduction in the length of processing time at the time of power on is the management information related to the removable memory. In the structure described above, by saving/recovering the management information related to the removable memory, the task of setting the management information at the time of power on is simplified and the preparation for a photographing operation or the preparation for a reproducing operation is speeded up.

It is to be noted that if the volume of information required for a reproducing operation is large, information with lesser significance may be temporarily recorded in the removable memory, with only a few crucial points of information and information necessary for reading out the related information from the removable memory (data position and the like) recorded in the non-volatile memory.

In addition, while the latest management information is saved in the embodiment, the present invention is not limited to this example. For instance, the number of overwrites can be further reduced by comparing the management information present on the memory 18 and the immediately preceding set of management data saved in the non-volatile memory 20 and by not saving the management information on the memory 18 in the non-volatile memory 20 if these sets of data are identical, when the power is turned off.

Furthermore, the main MPU 16 may determine the difference between previous management information (or standard management information) and the current management information to save only the new information corresponding to the difference in the non-volatile memory 20. Through such an operation, too, the volume of data to be saved is reduced so that the overwrite service life of the non-volatile memory 20 is extended.

In the embodiment, the management information is saved at the time of power off by taking into consideration the overwrite service life of the non-volatile memory 20. However, if the overwrite service life of the non-volatile memory 20 is not an issue, the save does not necessarily need to be performed at the time of power off. Instead, the management information may be saved while the power is on over specific time intervals. Alternatively, the management information may be saved at a point in time at which it has been modified. In other words, the management information may be saved in a power on state, and the power-off operation may be started without performing a save operation when the power is turned off. It is to be noted that in more exact terms, during a save operation performed at the time of power off described above, the main MPU 16 performs the save operation in response to an instruction for power-off processing before the power itself is cut off and issues an instruction to the sub-MPU 21 to turn off the power when the save operation is completed, and in response to the instruction, the sub-MPU 21 cuts off the power. In other words, performing a save operation at the time of a power off means that the save operation is performed before the power is cut off and then immediately after that, the power is cut off.

It is to be noted that while the explanation is given above in the embodiment by using an electronic camera as an example, the present invention is not limited to these details. The present invention may be adopted in all types of information processing apparatuses that utilize removable memory. For instance, it may be adopted in a dedicated word processing device that uses a floppy disk as the removable memory and a personal computer that uses a PC card or the like as the removable memory.

Figure 6:
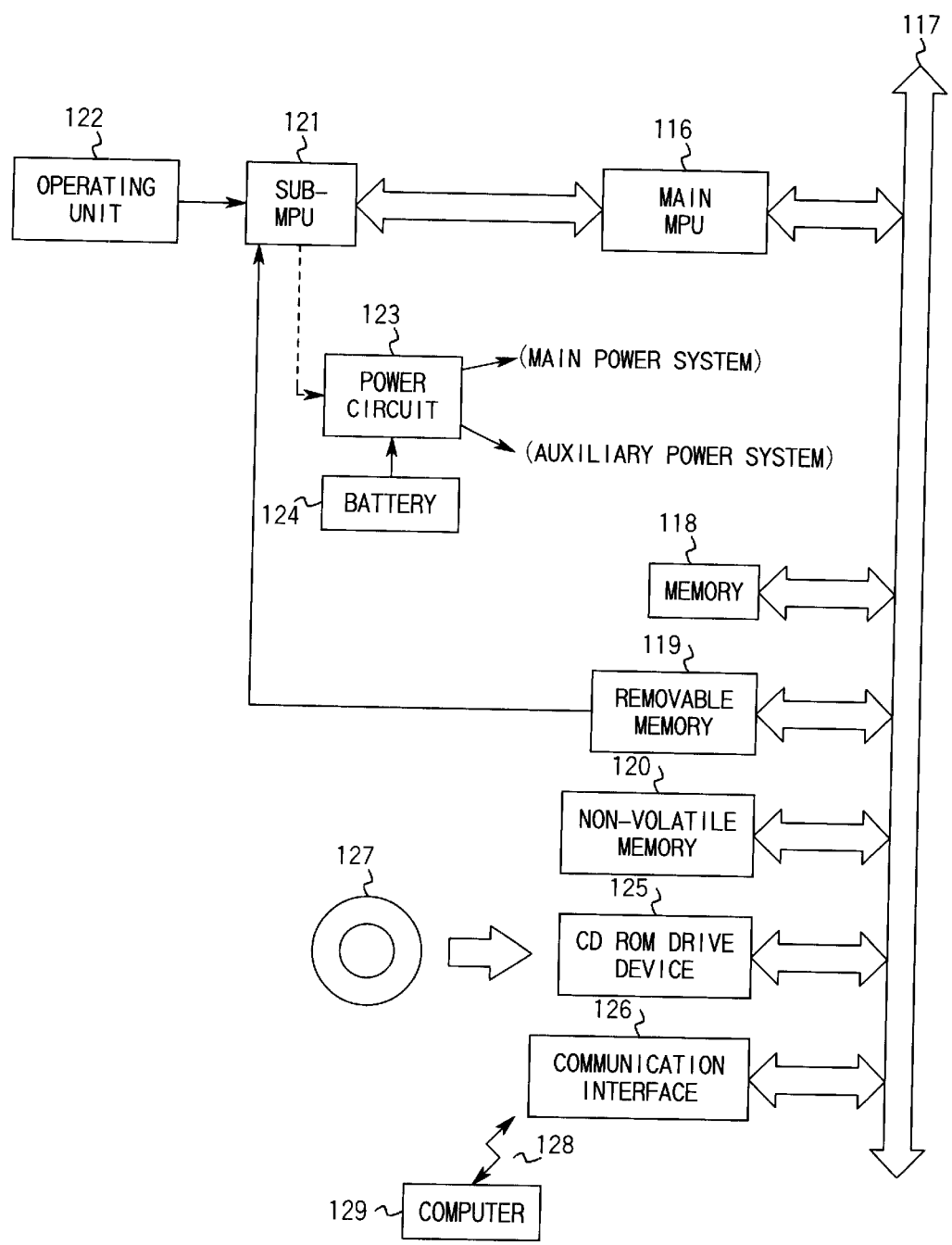
FIG. 6 illustrates the structure of a battery-driven portable personal computer.

FIG. 6 illustrates the structure of a battery-driven portable personal computer as an example. A main MPU 116 is a main CPU that executes programs and implements various types of control. The main CPU 116 is connected to a system bus 117. A memory 118, a removable memory 119 and a non-volatile memory 120 where management information is saved are connected to the system bus 117. The non-volatile memory 120 may be constituted of, for instance, a flash memory.

The personal computer is further provided with a sub-MPU 121 as in the case of the electronic camera illustrated in FIG. 1. The sub-MPU 121 shares the function of monitoring for an operation to detach the removable memory 119, an operation on an operating unit 122 and the like performed by the operator and notifying the main CPU 116 of the operating statuses.

The personal computer is also provided with a power circuit 123. The power circuit 123 stabilizes the output voltage from a battery 124 and outputs power over two separate power systems (a main power system and an auxiliary power system). The main power system supplies power to main circuits including the main CPU 116 and a monitor (not shown). Normally, the main power system cuts off power supply when the power to the personal computer is turned off. The auxiliary power system, on the other hand, supplies power at all times to circuits such as the sub-MPU 121 even when the power to the personal computer is turned off.

In the personal computer structured as described above, too, processing similar to that explained in reference to FIGS. 2, 4 and 5 can be executed. Thus, advantages similar to those achieved in the electronic camera explained earlier can be realized.

It is to be noted that a CD ROM drive device 125 and a communication interface 126 are connected to the system bus 117. A program for the processing described above that can be executed by the main CPU 116 is recorded and provided in a CD ROM 127. The CD ROM 127 is loaded into the CD ROM drive device 125 and is read by the main CPU 116. It is to be noted that the recording medium to record the program does not need to be a CD ROM. It may be constituted of any of various types of recording media including magnetic tape and DVD. In addition, the program may be provided via a transmission medium such as a telecommunication line, a typical example of which is the Internet. In other words, the program may be converted to and transmitted as a signal embodied in a carrier wave that transmits through a transmission medium.

The communication interface 126 of the personal computer may be connected to a communication line 128. A computer 129 is a server computer in which the program is stored and can be provided via the Internet. The communication line 128 may be a telephone line for the Internet or a personal computer communication or it may be a dedicated communication line.

It is to be noted that in the electronic camera in the embodiment, the program executed in the electronic camera is normally installed in a ROM or the like during the manufacturing process. However, the program may be installed in a ROM that allows an overwrite, so that an upgrade program can be provided from a recording medium such as a CD ROM via a personal computer through connection to the communication interface 126 of the personal computer illustrated in FIG. 6. Furthermore, an upgrade program may be provided via the Internet or the like as described above.

What is claimed is:

1. A camera that records image data generated by electronically capturing an image of a subject in a removable memory, comprising:

a non-volatile memory that differs from the removable memory in which the image data are recorded;

a means for data saving that saves management information related to recording or reproduction in the removable memory into said non-volatile memory before power to the camera is cut off, the management information being generated based upon information read out from the removable memory;

a means for data acquisition that reads out the management information from said non-volatile memory after the power to the camera is turned on; and a means for recovery that recovers the management information stored before the power is cut off based upon the management information read out by said means for data acquisition.

2. A camera according to claim 1, wherein:

said means for data saving saves the management information in said non-volatile memory during an operation performed to turn off the power to the camera.

3. A camera according to claim 1, wherein:

the management information saved by said means for data saving is removable memory hardware information that is required for removable memory device driver setting.

4. A camera according to claim 1, wherein:

the management information saved by said means for data saving is file system information required for management of files in the removable memory.

5. A camera according to claim 1, wherein:

the management information saved by said means for data saving is information required to reproduce image data from the removable memory and includes at least one of information indicating an image file to be reproduced first and reproduction order information.

6. A camera according to claim 1, further comprising:

a means for decision-making that makes a decision as to whether or not the removable memory has been replaced; and a means for restructuring that halts recovery of management information saved in said non-volatile memory and restructures new management information, when said means for decision-making decides that "the removable memory has been replaced during power off".

7. A camera that records image data generated by electronically capturing an image of a subject in a removable memory, comprising:

a non-volatile memory that differs from the removable memory in which the image data are recorded;

a means for data saving that saves management information managed by the camera in said non-volatile memory before power to the camera is cut off, the management information being generated based upon information read out from the removable memory;

a means for data acquisition that reads out the management information from said non-volatile memory after the power to the camera is turned on; and a means for recovery that recovers the management information stored before the power is cut off based upon the management information read out by said means for data acquisition, wherein said means for data saving additionally records new management information in an unrecorded area on said non-volatile memory and erases old management information in a batch when a specific volume of old management information has accumulated; and said means for data acquisition reads out most recent management information from said non-volatile memory.

8. A camera that records image data generated by electronically capturing an image of a subject in a removable memory, comprising:

a first microprocessor that controls a camera operation mainly; and a second microprocessor that supports the control operation of the first microprocessor, wherein the first microprocessor and the second microprocessor share and manage management information for the camera in correspondence to individual shares of said control operation, and the first microprocessor saves and recovers individual shares of the management information when the second microprocessor detects that power to the camera is turned off and on, the management information being generated based upon information read out from the removable memory.

9. An information processing apparatus at which a removable memory is detachably mounted, comprising:

a non-volatile memory that differs from the removable memory;

a means for data saving that saves management information related to recording or reproduction in the removable memory into said non-volatile memory before power to the information processing apparatus is cut off, the management information being generated based upon information read out from the removable memory;

a means for data acquisition that reads out the management information from said non-volatile memory after the power to the information processing apparatus is turned on; and a means for recovery that recovers the management information stored before the power is cut off based upon the management information read out by said means for data acquisition.

10. A recording medium that contains a program utilized in an information processing apparatus at which a removable memory is detachably mounted, the program comprising:

a data save instruction to save management information related to recording or reproduction in the removable memory to a non-volatile memory, which differs from the removable memory, before power to said information processing apparatus is cut off, the management information being generated based upon information read out from the removable memory;

a data acquisition instruction to read out the management information from said non-volatile memory after the power to said information processing apparatus is turned on; and a recovery instruction to recover the management information stored before the power is cut off based upon the management information read out by said data acquisition instruction.

11. A computer data signal embodied in a carrier wave comprising a program utilized in an information processing apparatus at which a removable memory is detachably mounted, the program comprising:

a data save instruction to save management information related to recording or reproduction in the removable memory to a non-volatile memory, which differs from the removable memory, before power to said information processing apparatus is cut off, the management information being generated based upon information read out from the removable memory;

a data acquisition instruction to read out the management information from said non-volatile memory after the power to said information processing apparatus is turned on; and a recovery instruction to recover the management information stored before the power is cut off based upon the management information read out by said data acquisition instruction.

12. A camera that records image data generated by electronically capturing an image of a subject in a removable memory, comprising:

a non-volatile memory that differs from the removable memory in which the image data are recorded; and a main MPU that saves management information related to recording or reproduction in the removable memory into said non-volatile memory before power to the camera is cut off, reads out the management information from said non-volatile memory after the power to the camera is turned on, and recovers the management information stored before the power is cut off based upon the management information read out by said main MPU, the management information being generated based on information read out from the removable memory.

13. The camera according to claim 12, wherein:

the management information saved by said main MPU is status information that indicates whether or not the currently loaded removable memory can be utilized for image data recording.

14. The camera according to claim 12, wherein:

the management information saved by said main MPU is updated each time image data are recorded in the removable memory and includes at least one of a number of frames, an image file name and a directory name.

15. The camera according to claim 12, wherein:

said main MPU performs compression on the management information and then saves the compressed management information in said non-volatile memory.

16. A camera that records image data generated by electronically capturing an image of a subject in a removable memory, comprising:

a non-volatile memory that differs from the removable memory in which the image data are recorded; and a main MPU that saves management information related to recording or reproduction in the removable memory into said non-volatile memory before power to the camera is cut off, the management memory being generated based on information read out from the removable memory, reads out the management information from said non-volatile memory after the power to the camera is turned on, and recovers the management information stored before the power is cut off based upon the management information read out by said main MPU, wherein:

said main MPU saves the management information in said non-volatile memory during an operation performed to turn off the power to the camera.

17. A camera that records image data generated by electronically capturing an image of a subject in a removable memory, comprising:

a non-volatile memory that differs from the removable memory in which the image data are recorded; and a main MPU that saves management information related to recording or reproduction in the removable memory into said non-volatile memory before power to the camera is cut off, the management information being generated based upon information read out from the removable memory, reads out the management information from said non-volatile memory after the power to the camera is turned on, and recovers the management information stored before the power is cut off based upon the management information read out by said main MPU, wherein the management information saved by said main MPU is removable memory hardware information that is required for removable memory device driver setting.

18. A camera that records image data generated by electronically capturing an image of a subject in a removable memory, comprising:

a non-volatile memory that differs from the removable memory in which the image data are recorded; and a main MPU that saves management information related to recording or reproduction in the removable memory into said non-volatile memory before power to the camera is cut off, the management information being generated based upon information read out from the removable memory, reads out the management information from said non-volatile memory after the power to the camera is turned on, and recovers the management information stored before the power is cut off based upon the management information read out by said main MPU, wherein the management information saved by said main MPU is file system information required for management of files in the removable memory.

19. A camera that records image data generated by electronically capturing an image of a subject in a removable memory, comprising:

a non-volatile memory that differs from the removable memory in which the image data are recorded; and a main MPU that saves management information related to recording or reproduction in the removable memory into said non-volatile memory before power to the camera is cut off, the management information being generated based upon information read out from the removable memory, reads out the management information from said non-volatile memory after the power to the camera is turned on, and recovers the management information stored before the power is cut off based upon the management information read out by said main MPU, wherein the management information saved by said main MPU is information required to reproduce image data from the removable memory and includes at least one of information indicating an image file to be reproduced first and reproduction order information.

20. A camera that records image data generated by electronically capturing an image of a subject in a removable memory, comprising:

a non-volatile memory that differs from the removable memory in which the image data are recorded;

a sub-MPU that makes a decision as to whether or not the removable memory has been replaced; and a main MPU that saves management information related to recording or reproduction in the removable memory into said non-volatile memory before power to the camera is cut off, the management information being generated based upon information read out from the removable memory, reads out the management information from said non-volatile memory after the power to the camera is turned on, recovers the management information stored before the power is cut off based upon the management information read out by said main MPU, and halts recovery of management information saved in said non-volatile memory and restructures new management information, when said sub-MPU decides that "the removable memory has been replaced during power off".

21. The camera according to claim 20, wherein:

said sub-MPU, under auxiliary power, monitors for an operation to replace the removable memory during power off and starts up said main MPU upon detecting a replacement; and said main MPU starts restructuring management information even during a power off affected by an operator.

22. The camera according to claim 20, wherein:

said sub-MPU, under auxiliary power, monitors for an operation to replace the removable memory during power off; and said main MPU restructures new management information by halting recovery of the management information saved by said non-volatile memory when the auxiliary power to said sub-MPU is cut off.

23. An information processing apparatus at which a removable memory is detachably mounted, comprising:

a non-volatile memory that differs from the removable memory in which the image data are recorded; and a main MPU that saves management information related to recording or reproduction in the removable memory into said non-volatile memory before power to the information processing apparatus is cut off, reads out the management information from said non-volatile memory after the power to the information processing apparatus is turned on, and recovers the management information stored before the power is cut off based upon the management information read out by said main MPU.

24. A camera that records image data generated by electronically capturing an image of a subject in a removable memory, comprising:

a non-volatile memory that differs from the removable memory in which the image data are recorded; and a main MPU that saves management information related to recording next image data in the removable memory into said non-volatile memory before power to the camera is cut off, reads out the management information from said non-volatile memory after the power to the camera is turned on, and recovers the management information stored before the power is cut off based upon the management information read out by said main MPU.

* * * * *